United States Patent [19]

Yamao

[11] Patent Number: 5,203,024
[45] Date of Patent: Apr. 13, 1993

[54] ANTENNA SELECTION DIVERSITY RECEPTION SYSTEM

[75] Inventor: Yasushi Yamao, Kanagawa, Japan

[73] Assignee: Nippon Telegraph & Telephone Corp., Tokyo, Japan

[21] Appl. No.: 691,295

[22] Filed: Apr. 25, 1991

[30] Foreign Application Priority Data

Apr. 27, 1990 [JP] Japan .................................. 2-110517
Apr. 27, 1990 [JP] Japan .................................. 2-114244
Apr. 27, 1990 [JP] Japan .................................. 2-114245

[51] Int. Cl.$^5$ .......................................... H04B 17/02
[52] U.S. Cl. ................................ 455/133; 455/277.1; 370/95.1
[58] Field of Search ............................ 370/95.1, 104.1; 375/100; 455/272, 277, 133, 134, 135

[56] References Cited

U.S. PATENT DOCUMENTS

| | | | |
|---|---|---|---|
| 4,613,975 | 9/1986 | Aoyagi et al. ....................... | 375/100 |
| 4,719,649 | 1/1988 | Woodsum et al. .................... | 455/1 |
| 4,742,567 | 5/1988 | Ohe et al. ............................ | 455/277 |
| 4,977,616 | 12/1990 | Linder et al. ........................ | 455/277 |

OTHER PUBLICATIONS

Afrashteh et al., "Performance of a Novel Selection Diversity Technique in an Experimental TDMA System for Digital Portable Radio Communications", *IEEE Global* Communication Conference 1988, pp. 26.2.1–26.2.5.

Yamao et al., "Predictive Antenna Selection Diversity (PASD) for TDMA Mobile Radio", Yasushi Yamao and Yoshinori Nagao, NTT Radio Communication Systems Laboratories, Mar. 1991, pp. 46.4.1–46.4.5.

*Primary Examiner*—Douglas W. Olms
*Assistant Examiner*—Shick Hom
*Attorney, Agent, or Firm*—Armstong, Westerman, Hattori, McLeland & Naughton

[57] ABSTRACT

An antenna selection diversity receiver system for TDM signals that switches antennas for every assigned time slot so that the best receive signal quality is obtained in the assigned time slot according to the prediction made by using the signal quality just before the assigned time slot. The prediction of signal quality is carried out according to the receive level ($R_1$, $R_2$), and the slope of the same of each of the antennas just before the assigned time slot. The signal quality may be determined by the average code error rate, receive level at the center of the assigned slot, or the minimum receive level in the assigned slot. The prediction is carried out either through linear prediction or non-linear prediction.

8 Claims, 14 Drawing Sheets

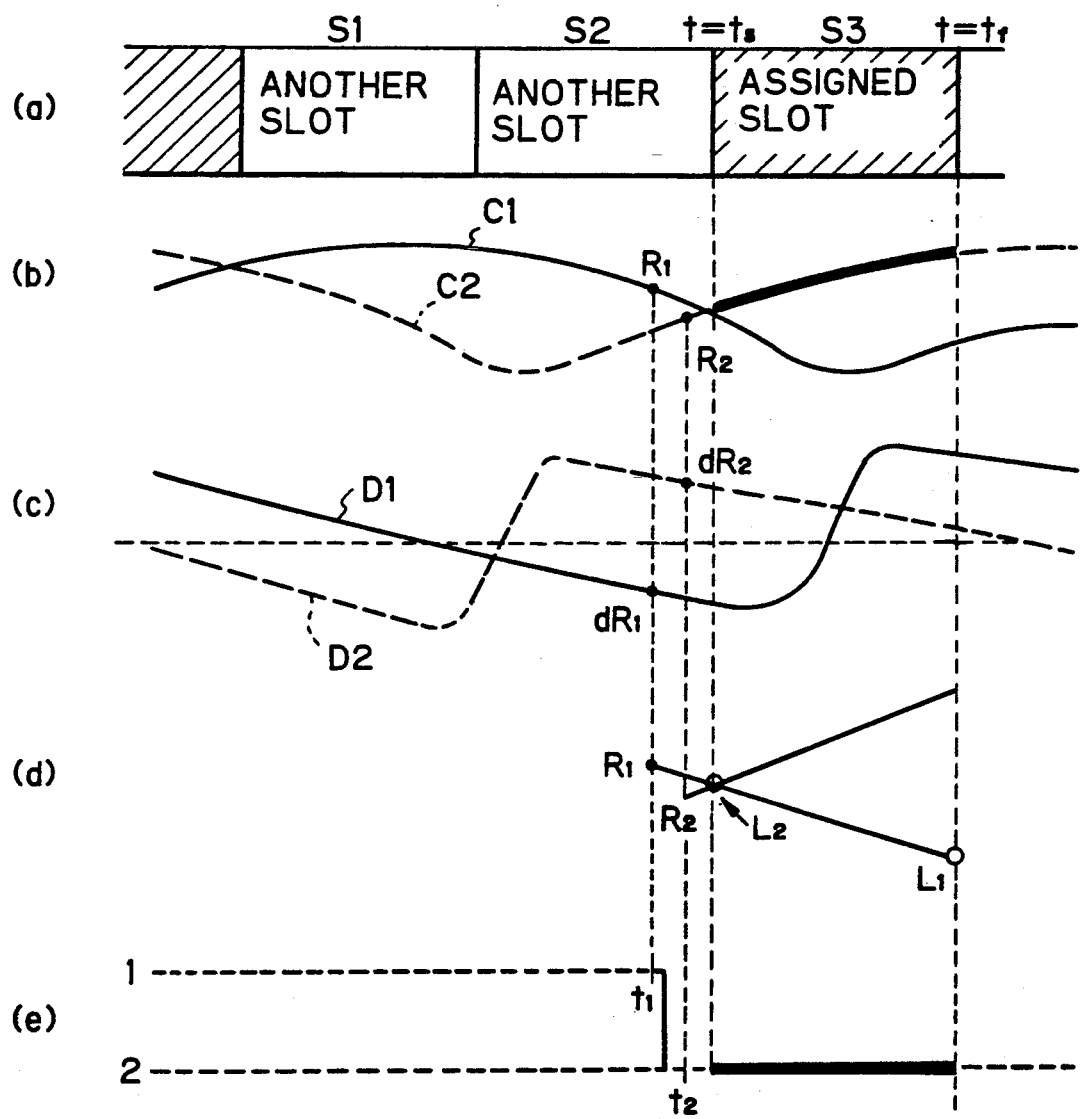

ANTENNA SELECTION DIVERSITY RECEPTION SYSTEM

BACKGROUND OF THE INVENTION

The present invention relates to a diversity receiver system and, in particular, relates to an antenna selection diversity receiver system for overcoming fading in radio communication system.

In a radio communication system, receive level is subject to change because of fading, and the decrease of receive level causes the deterioration of signal quality. In order to solve that problem and to provide stable and high quality information transmission, a number of diversity techniques have been proposed. In particular, an antenna selection diversity reception system is considered to be promising for a mobile telephone system in which a miniaturized receiver set with low power consumption is essential.

FIG. 10 shows _ prior antenna selection diversity receiver for a 3 channel TDM system (time division multiplex). That kind of prior art is shown in IEEE Global Communication Conference 1988, entitled "Performance Of a Novel Selection Diversity Technique In an Experimental TDMA System For Digital Portable Radio Communications", pages 26.2.1–26.2.5. In the figure, the numerals 1 and 2 are receive antennas, 3 is a selection switch, 4 is a receiver/demodulator, 5 is a frame synchronization circuit, 6 is an antenna selection circuit, 6-1 is a timing circuit, 6-2 is a switch control circuit, 6-3 is a receive level measurement circuit, 6-4 and 6-5 are sample-hold circuits, and 6-6 is a comparator.

The signal A1 in the antenna 1 and the signal A2 in the antenna 2 are switched by the selection switch 3, and the selected signal A1 or A2 is applied to the receiver/demodulator 4, which demodulates the receive signal. The demodulated signal is applied to the frame synchronization circuit 5 for the frame synchronization. The antenna selection circuit 6 receives the frame timing signal from the frame synchronization circuit 5, and recognizes the receive timing of an assigned burst slot to its own receive station. The selection switch 3 is switched just before that beginning of the signal burst slot of its own station so that the receive levels on two antennas are compared.

FIG. 11 shows a switching process in the prior art, in which (a) shows a frame structure of a receive signal, which is a TDM signal with three channels in each frame. In this embodiment, the third burst in each frame is the time slot assigned to the own station. The timing circuit 6-1 forwards to the receive level measurement circuit 6-3 a trigger signal at time $t_1$ which is just before the beginning of the assigned time slot so that the receive level $R_1$ at the antenna 1 is kept in the sample-hold circuit 6-4. Then, the switch control circuit 6-2 switches the selection switch 3 to the other antenna 2 so that the receive level $R_2$ at the antenna 2 at time $t_2$ is kept in the sample-hold circuit 6-5. The comparator 6-6 compares $R_1$ with $R_2$. The switch control circuit 6-2 selects the antenna which provides the higher receive level according to the result of the comparison, and keeps the switch 3 to receive the assigned time slot according to said comparison result.

For instance, assuming that the receive level in the antennas 1 and 2 changes as shown by the curves C1 and C2 in FIG. 11(b), the switch control circuit 6-2 forwards the selection signal as shown in FIG. 11(c), in which the curve (1) indicates the selection of the antenna 1, and the curve (2) shows the selection of the antenna 2. $R_1$ is the level on the curve C1 just before the assigned time slot when the antenna 1 is selected, and $R_2$ is the receive level on the curve C2 just before the assigned time slot when the antenna 2 is selected. As the level relations $R_1 > R_2$ is satisfied at time $t_1$ (or $t_2$) just before the assigned time slot, the antenna 1 is selected for receiving the assigned burst signal. The receive level is compared before each assigned slot, and an antenna which provides the higher receive level is selected so that the receive level applied to the receiver/demodulator 4 is kept high to prevent data error.

However, the prior art has the disadvantage that little diversity effect is obtained when fading rate is high, or the receive level changes rapidly. When the receive level changes after the levels $R_1$ and $R_2$ are measured at time $t_1$ or $t_2$, the selected antenna does not provide the higher receive level.

FIG. 11(d) and FIG. 11(e) show the above situation. When the receive levels of the antennas 1 and 2 change as shown in the curves C1 and C2 in FIG. 11(d), the relations $R_1 > R_2$ are satisfied at time $t_1$ and $t_2$, and therefore, the antenna 1 is selected for receiving the assigned burst signal. However, after the antenna is switched, the receive levels are reversed, and the selected antenna provides the lower receive signal. In that case, an error rate is not improved by an antenna selection diversity system.

As mentioned above, the prior system is not useful when fading rate is high.

SUMMARY OF THE INVENTION

It is an object, therefore, of the present invention to provide a new and improved antenna selection diversity receiver system which overcomes the disadvantages and limitations of a prior art.

It is also an object of the present invention to provide an antenna selection diversity receiver system which follows rapid fading rate.

The above and other objects are attained by an antenna selection diversity receiver system for TDM receive signal comprising; a plurality of antennas; a selection switch for selecting one of said antennas; a receiver/demodulator coupled with the selected antenna through said selection switch for providing demodulated receive signal and receive level; a frame synchronization circuit coupled with output of said receiver/demodulator for effecting frame synchronization of TDM signal; an antenna selection circuit coupled with output of said receiver/demodulator for receiving said receive level, and coupled with said selection switch for controlling said selection switch; wherein said antenna selection circuit comprises; a timing circuit coupled with said frame synchronization circuit for finding beginning of assigned time slot; first storage means for storing receive level of each antenna just before said assigned time slot; slope means for providing slope of said receive level of each antenna; second storage means for storing output of said slope means; prediction means for predicting receive signal quality of each antenna in said assigned time slot according to said receive level and said slope by using output of said first storage means and said second storage means; and a switch control circuit coupled with said timing circuit and said prediction means for switching said selection switch just before beginning of said assigned time slot for every assigned slots so that an antenna providing the best predicted receive signal quality in assigned time slot is selected.

BRIEF DESCRIPTION OF THE DRAWINGS

The foregoing and other objects, features, and attendant advantages of the present invention will be appreciated as the same become better understood by means of the following description and accompanying drawings wherein;

FIG. 3C shows another modification of FIG. 3A.

DESCRIPTION OF THE PREFERRED EMBODIMENTS

Figure 1:
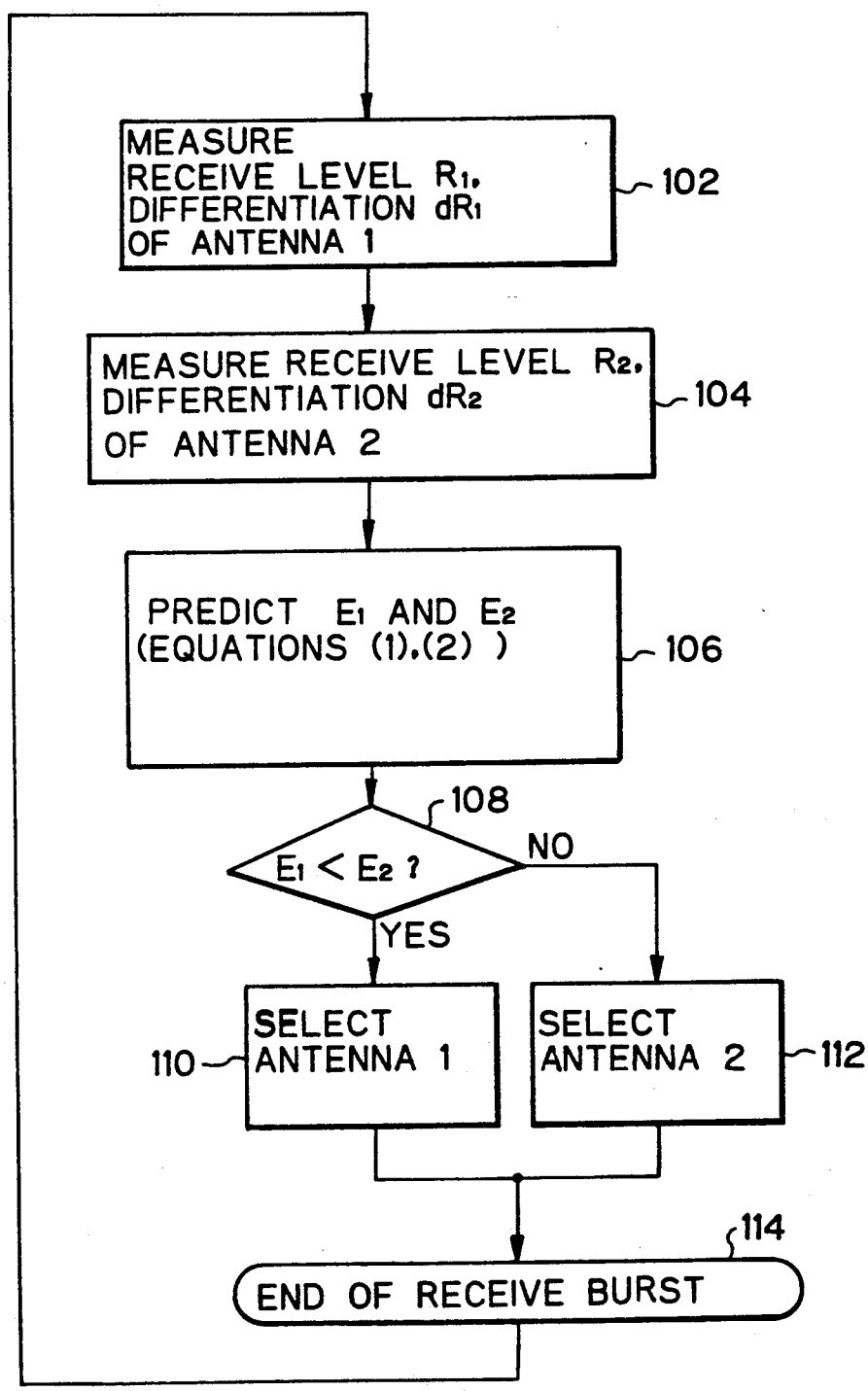
FIG. 1 is an operational flow chart of the first embodiment according to the present invention.
Figure 2:
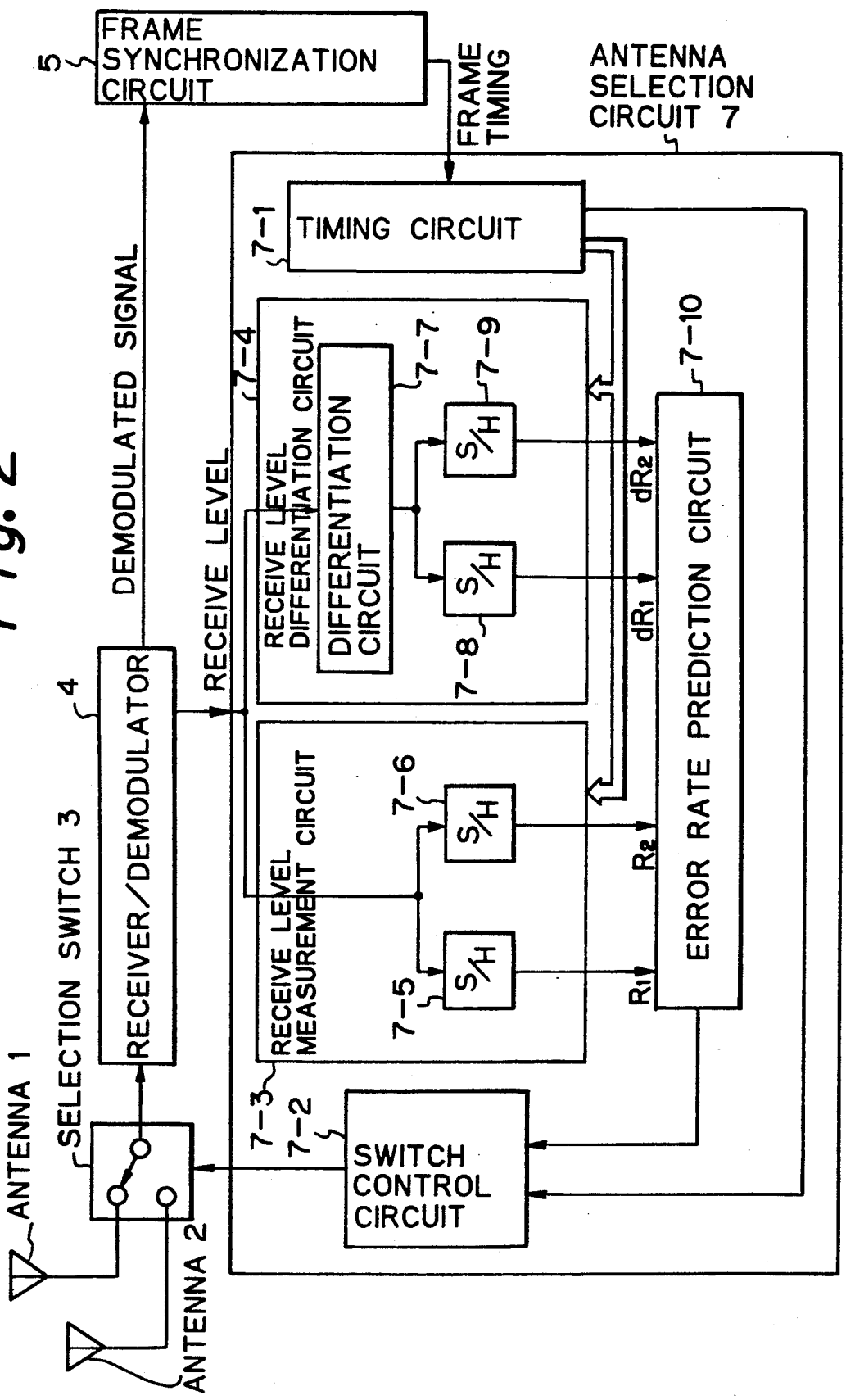
FIG. 2 is a block diagram of an antenna selection diversity receiver of the first embodiment according to the present invention.
Figure 10:
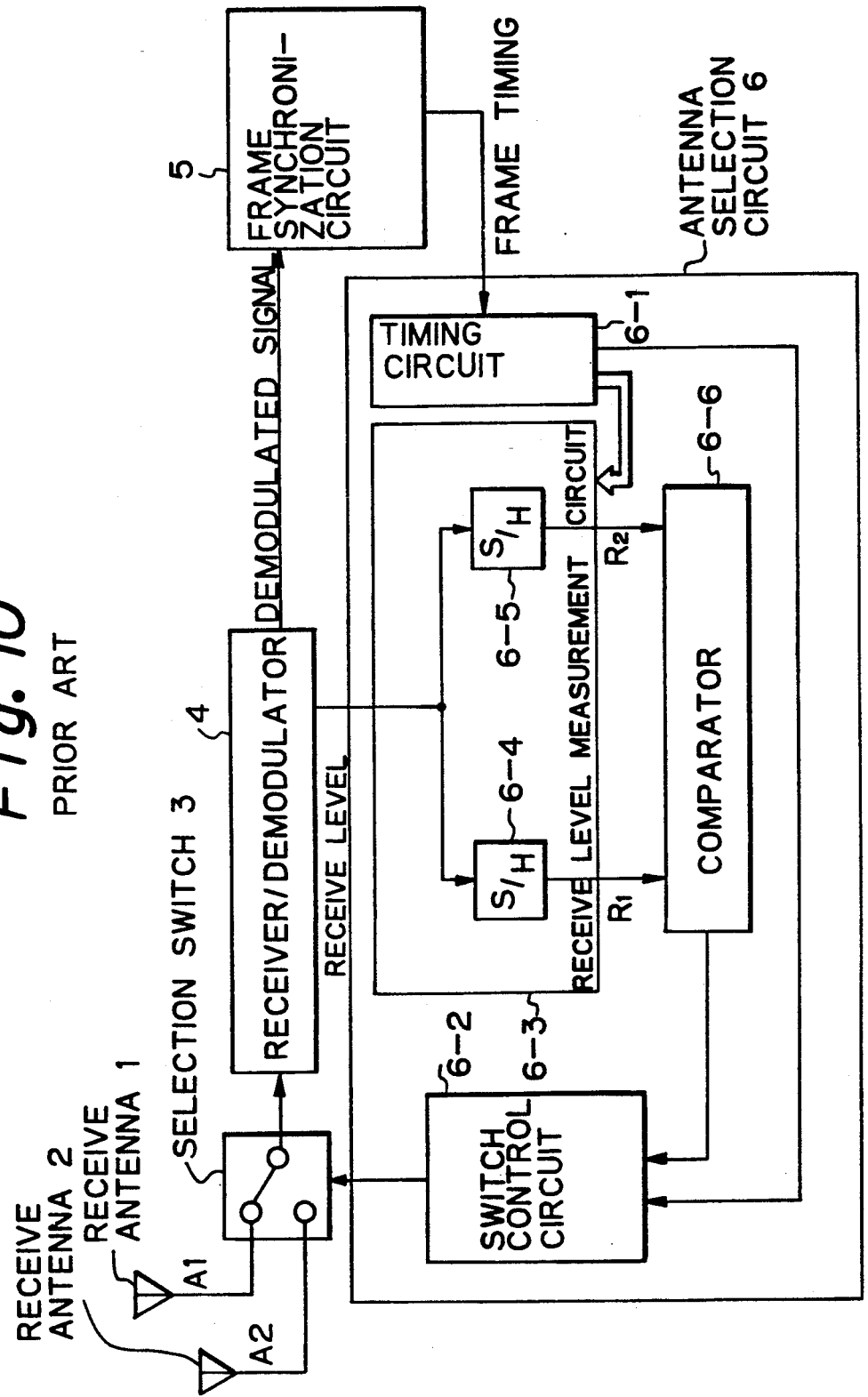
FIG. 10 is a block diagram of a prior diversity receiver.

FIG. 1 shows an operational flow chart of the first embodiment of the present invention, and FIG. 2 is a block diagram of the receiver according to the present invention. The same numerals in FIG. 2 as those in FIG. 10 show the same members. The numeral 7 in FIG. 2 is an antenna selection circuit, 7-1 is a timing circuit, 7-2 is a switch control circuit, 7-3 is a receive level measurement circuit, 7-4 is a receive level differentiation circuit, 7-5, 7-6, 7-8 and 7-9 are sample hold circuits, 7-7 is a differentiation circuit, and 7-10 is an error prediction circuit.

The receive signal on the antenna 1 or 2 is applied to the receiver/demodulator 4 through the selection circuit 3. The demodulated signal in the receiver/demodulator 4 is applied to the frame synchronization circuit 5 for the frame synchronization.

The antenna selection circuit 7 determines the assigned burst timing of the own station according to the frame timing signal from the frame synchronization circuit 5, and switches the selection switch 3 just before the beginning of the assigned slot so that the receive levels and the differentiating coeffecients of two antennas are measured.

Figure 3A:
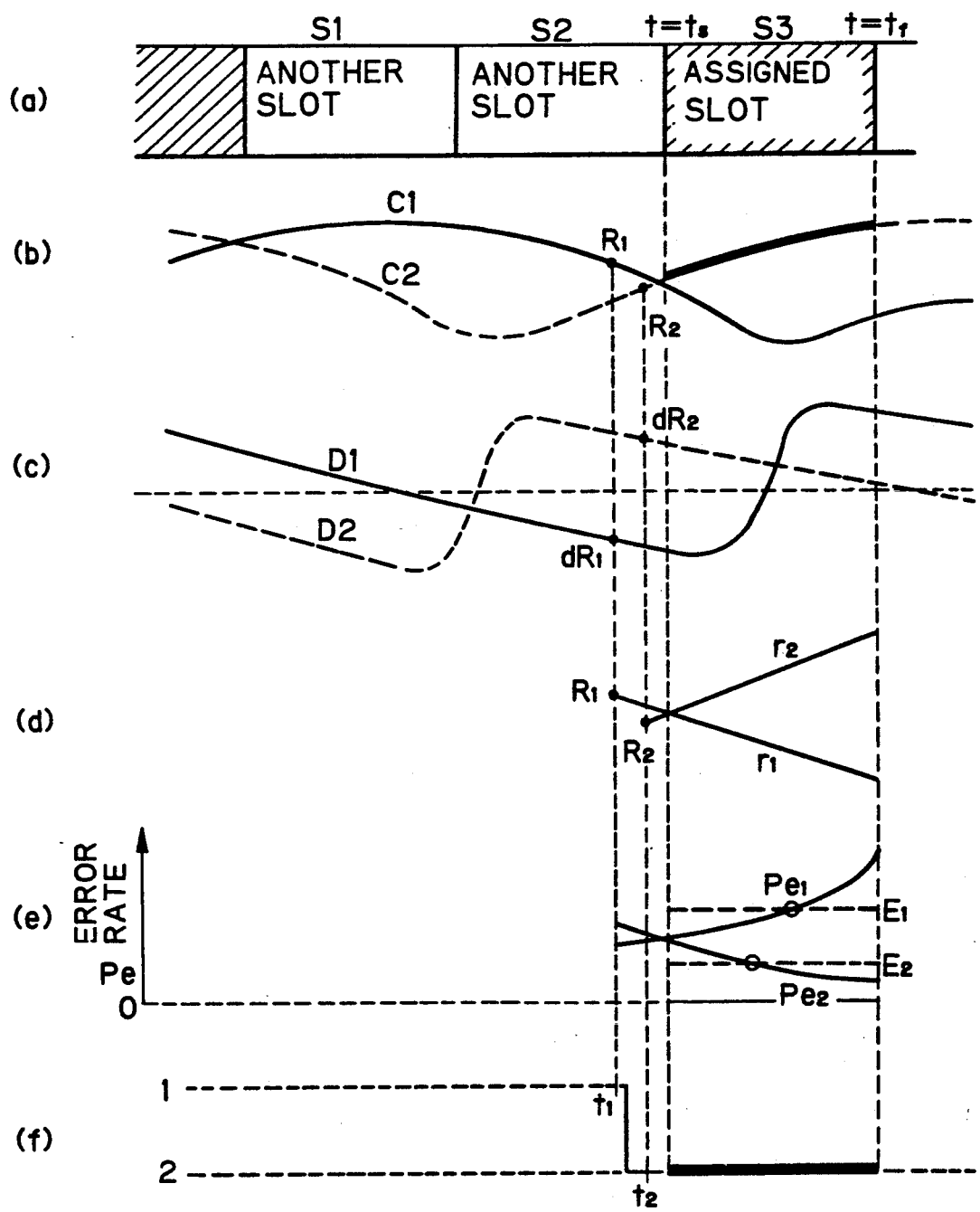
FIG. 3A shows the operation of the antenna selection in the first embodiment of the present invention.
Figure 11:
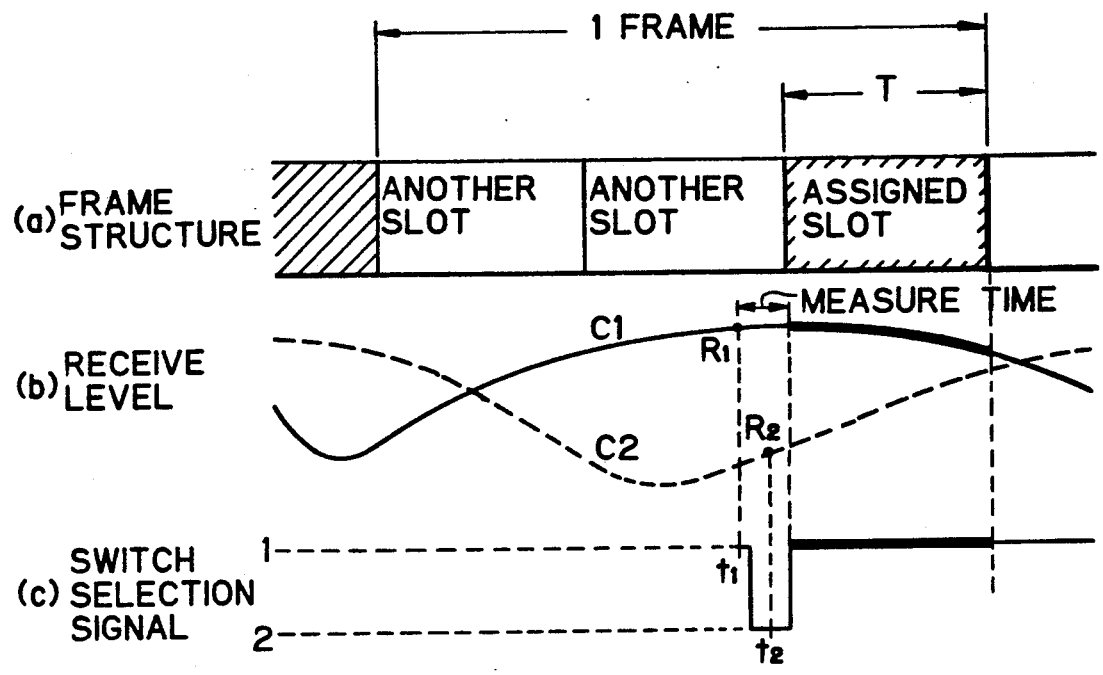
FIG. 11 shows operation of the antenna selection in the prior art.
Figure 11:
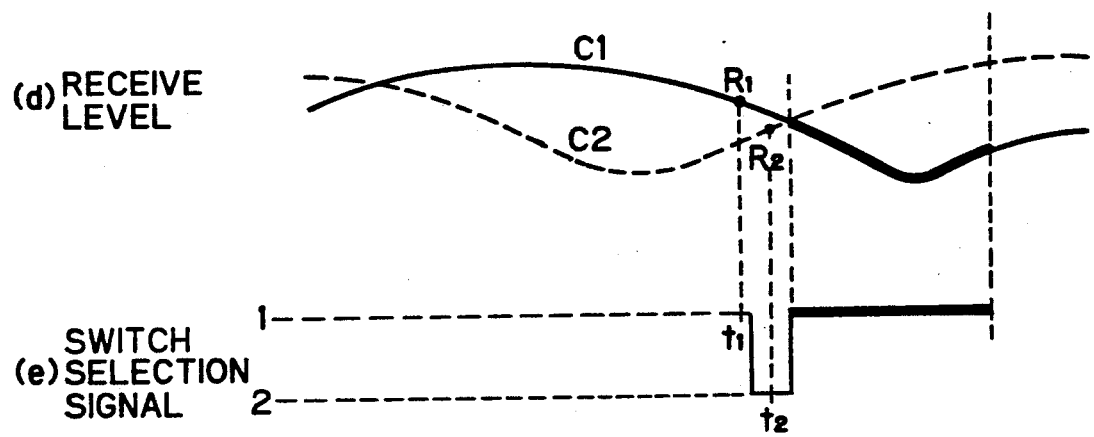

FIG. 3A shows the operation of the antenna selection. FIG. 3A(a) shows the frame structure of a receive signal, and is the same as FIG. 11(a). The symbol S1, S2 and S3 show slots in the frame, and it is assumed in the present embodiment that the slot S3 is the assigned slot, and S1 and S2 are other slots of other channels.

The timing circuit 7-1 sends the receive level measurement circuit 7-3 a trigger signal at time $t_1$ which is just before the receive timing of the assigned time slot S3 so that the receive level $R_1$ by the selected antenna 1 at time $t_1$ is kept in the sample hold circuit 7-5. Simultaneously, the trigger signal is sent to the receive level differention circuit 7-4 so that the differentiating coefficient $dR_1$ which is obtained by differentiating the receive level of the antenna 1 by the difference circuit 7-7 is kept in the sample hold circuit 7-8 (102 in FIG. 1).

It should be appreciated that the receive levels $R_1$ and $R_2$ just before the assigned burst slot concern the receive signal of the time slot S2, which differs from the assigned time slot S3. In any event, the receive level in another time slot S2 is sufficient to predict the signal quality in the assigned time slot.

Then, the switch control circuit 7-2 switches the selection switch 3 to the other antenna 2 so that the receive level $R_2$ and the differentiating coefficient $dR_2$ at time $t_2$ are kept in the sample hold circuits 7-6 and 7-9, respectively (104 in FIG. 1). The measured four values $R_1$, $R_2$, $dR_1$ and $dR_2$ are applied to the error rate prediction circuit 7-10, which predicts the receive level and the error rate in the assigned time slot S3. For instance, when the receive level of the antennas 1 and 2 change as shown in the curves C1 and C2 in FIG. 3A(b), the differentiating coefficients of the receive levels C1 and C2 are shown by the curves D1 and D2 in FIG. 3A(c).

The predicted receive levels $r_1$ and $r_2$ of each of the antennas, and the average error rates $E_1$ and $E_2$ of each of the antennas in the assigned time slot S3 which follows the measure time $t_1$ and $t_2$ are predicted as follows by using the values $R_1$, $R_2$, $dR_1$ and $dR_2$ (106 in FIG. 1).

$$r_i(t) = R_i + dR_i(t-t_i) \quad (i=1,2) \tag{1}$$

$$E_i = \frac{1}{t_f - t_s} \int_{t_s}^{t_f} P_e[r_i]dt \quad (i=1,2) \tag{2}$$

where $t_s$ and $t_f$ are beginning time and end time of the assigned time slot S3, respectively, and $P_e[r]$ is the error rate when the receive level is r.

For instance, when the differential encoded QPSK signal is detected through differential detection process, the theoretical error rate is;

$$P_e[r] = \tfrac{1}{2}\exp[-r(t)/r_0] \tag{3}$$

where $r_0$ is the receive level which provides the normarized signal to noise ratio ($E_b/N_0$) to be equal to 1 at an input of a detector, where $E_b$ is receive power for each signal bit, and $N_0$ is noise power density.

The values $r_1$, $r_2$, $E_1$ and $E_2$ are predicted according to the above equations, and in the present embodiment, $E_1 > E_2$ is obtained as shown in FIG. A.3(d) and FIG. A.3(e) (108 in FIG. 1). The predicted error rate is applied to the switch control circuit 7-2, which selects the antenna 2 which provides the lower error rate, as shown in FIG. 3A(f) (112 in FIG. 1). Thus, the error rate when the assigned burst signal is received is kept low. The antenna 1 would be selected when $E_1 \leq E_2$ is satisfied.

When the receive operation in the assigned time slot S3 finishes (114 in FIG. 1), the operation returns to the box 102 in FIG. 1 so that the similar operation is repeated for the succeeding frames.

It should be noted that that as the assigned slot is S3 in the present embodiment, the measurement is carried out during the slot S2 which is just before the assigned time slot. When the assigned time slot is S2, the measurement is of course carried out during the slot S1 which is just before the assigned time slot.

The curve of the receive level in FIG. 3A(b) is the same as that of FIG. 11(d). In the prior art of FIG. 11(d), the antenna 1 is selected, and therefore, the error rate in the assigned burst timing is high. On the other hand, as the present invention selects the antenna 2, the low error rate is obtained.

As mentioned above, according to the above embodiment, the antenna is selected according to the predicted average error rate of each of the antennas calculated by using the receive level and the differentiating coefficient of the receive level of each of the antennas. Therefore, the antenna which provides the lower error rate in the assigned burst timing is selected even when the receive levels are reversed after the receive levels ($R_1$, $R_2$) are measured. Thus, the effect of the diversity reception is improved.

Figure 3B:
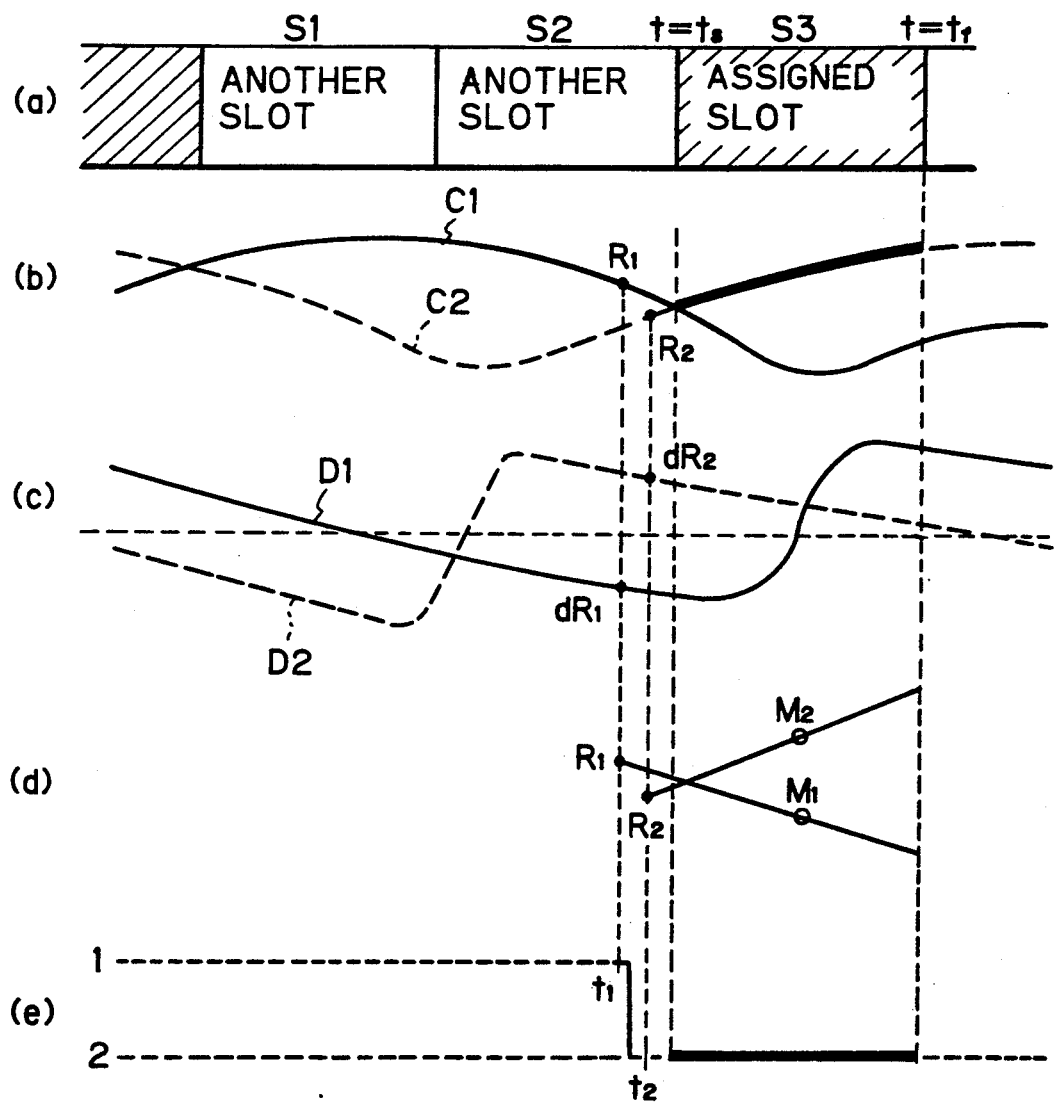
FIG. 3B shows the modification of FIG. 3A.

FIG. 3B shows the modification of the embodiment of FIG. 3A, and the same numerals in FIG. 3B show the same members as those in FIG. 3A. The feature of FIG. 3B is that the antenna is selected so that the receive level at the center of the assigned time slot or the average receive level during the slot is higher than that of the other antenna.

The receive level ($M_1$, $M_2$) at the center of the assigned time slot by each antenna is as follows.

$$M_i = R_i + dR_i((t_s + t_f)/2 - t_i) \quad (i = 1 \text{ or } 2) \tag{2A}$$

$M_i$ also presents the average receive level during the assigned time slot. The above equation (2A) is used for the selection of the antenna, instead of the equation (2). It should be noted in FIG. 3B that the receive levels $M_1$ and $M_2$ are predicted on the assumption that the receive level changes linearly.

FIG. 3C shows another modification of the embodiment of FIG. 3A, and the same numerals in FIG. 3C show the same members as those in FIG. 3A. The feature of the FIG. 3C is that the antenna is selected depending upon the minimum receive level during the assigned time slot S3 so that the minumum receive level of the selected antenna is higher than the minumum receive level of the other antenna.

The minimum receive level $L_1$ for the antenna 1, and the minimum receive level $L_2$ for the second antenna 2 are predicted as follows.

$$\left.\begin{array}{l} L_i = R_i + dR_i(t_s - t_i) \quad (dR_i \geq 0, i = 1 \text{ or } 2) \\ L_i = R_i + dR_i(t_f - t_i) \quad (dR_i < 0, i = 1 \text{ or } 2) \end{array}\right\} \tag{2B}$$

In three modifications in FIG. 3A, FIG. 3B and FIG. 3C, the antenna 2 is selected in the assigned time slot S3.

Next, the transient response of a differentiating circuit is discussed.

Figure 4:
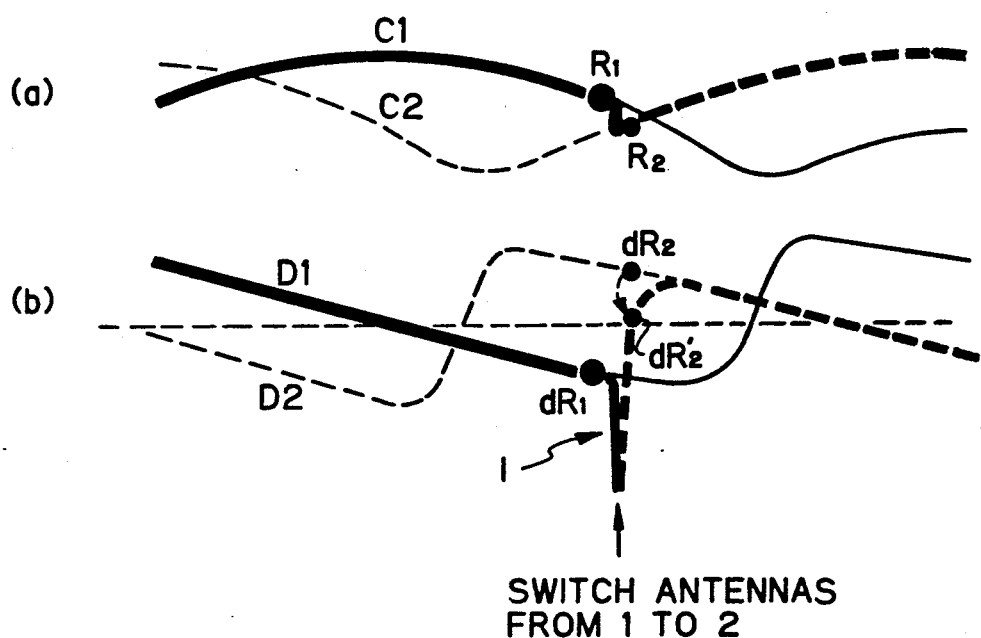
FIG. 4 shows the transient response of a differentiation circuit.

FIGS. 4(a) and 4(b) show the same signal levels as those of FIGS. 3A(a) and 3A(b). The thick lines in FIG. 4(a) and FIG. 4(b) show the receive level provided at the output of the receiver/demodulator 4 in FIG. 2, and the differentiated value provided at the output of the differentiating circuit 7-7, respectively. When the antennas are switched from the antenna 1 to the antenna 2 between the time $t_1$ and the time $t_2$, the receive level at the output of the selection switch 3 has the uncontinuous step by the level ($R_2-R_1$) Because of that step of the receive level, the differentiating waveform of the receive level has the transient response I in the form of negative impulse as shown in FIG. 4(b). Although the transient response converges in a short time, the differentiating coefficient $dR_2'$ measured just after the switching must include not only the desired differentiating coefficient $dR_2$ but also said transient response. When the transient error is large, the measured values of $r_2$ and $E_2$ in the equations (1) and (2) must also have the large error, and the correct antenna selection is impossible. The larger the value ($R_2-R_1$) is, the larger the transient error is. As the transient error becomes small when the duration between the switching time and the measurement time $t_2$ is long, it would be preferable to take $t_2-t_1$ longer. However, when that time $t_2-t_1$ is too long, the error rate $E_1$ which is predicted by using $dR_1$ at time $t_1$ would have large error since the value $dR_1$ itself would change until the assigned burst slot time due to rapid fading.

Figure 5:
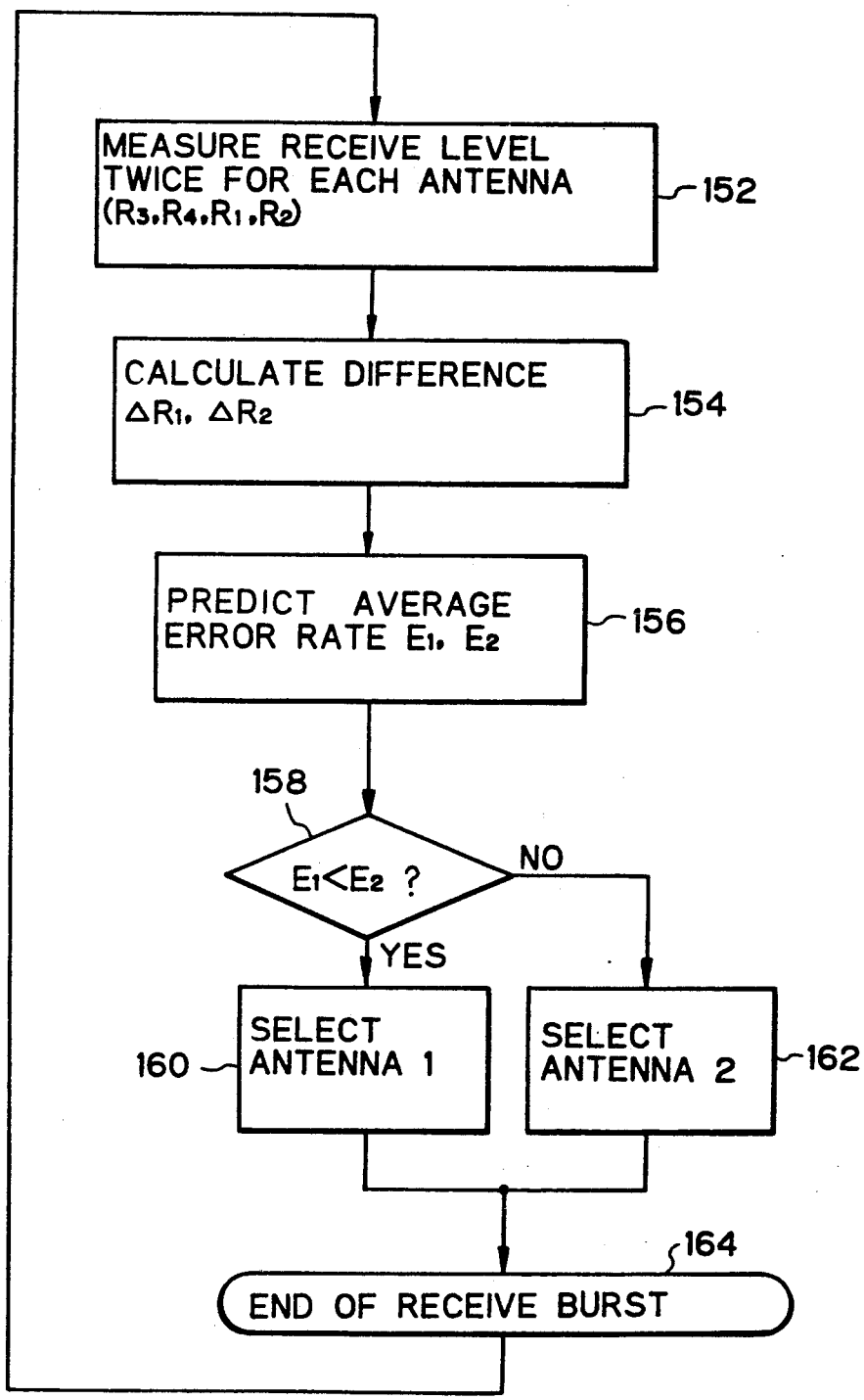
FIG. 5 is an operational flow chart of the second embodiment according to the present invention.
Figure 6:
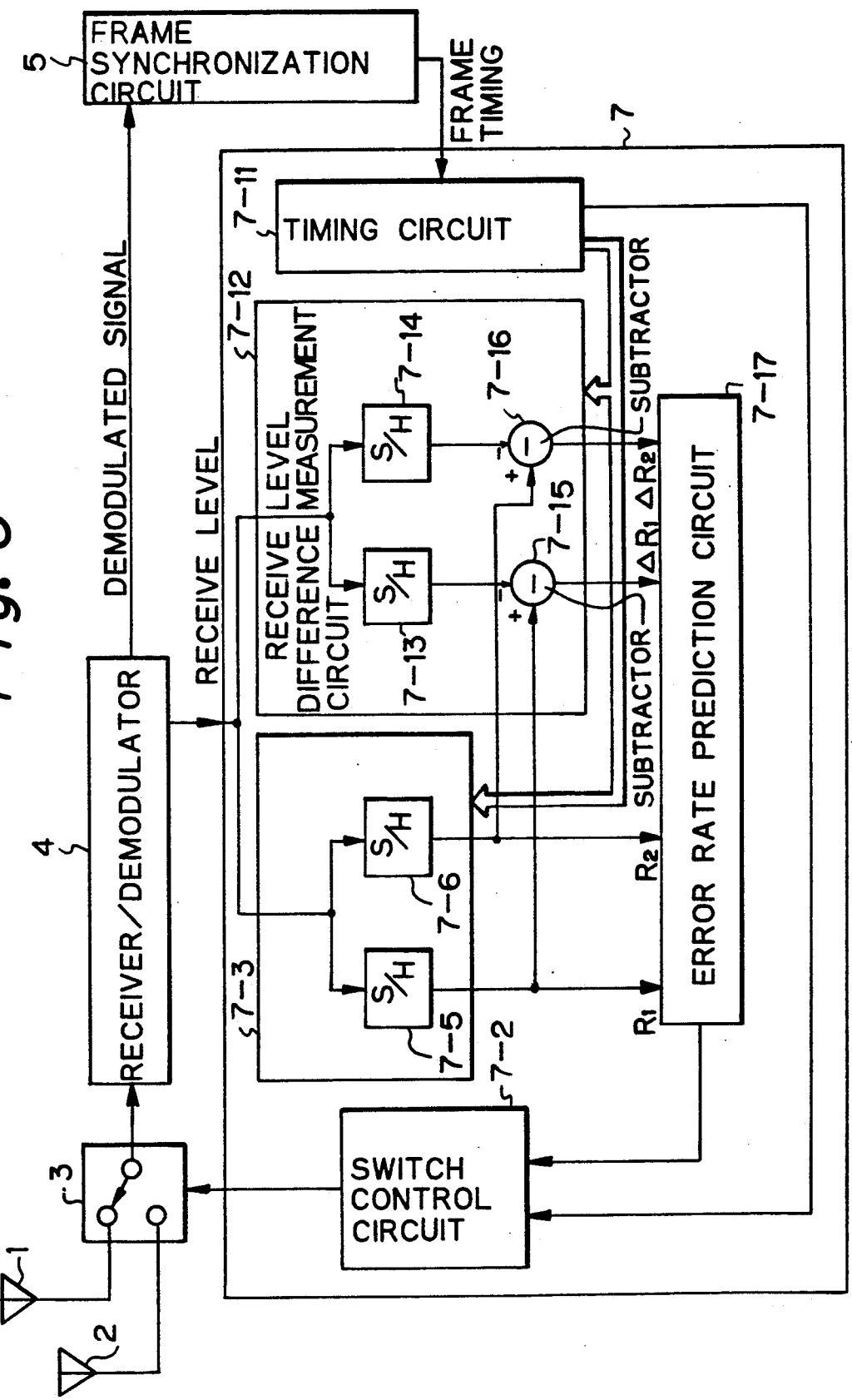
FIG. 6 is a block diagram of an antenna selection diversity receiver, of the second embodiment according to the present invention.

FIGS. 5 and 6 show the second embodiment of the present invention for overcoming the above problem. FIG. 5 shows the operational flow diagram, and FIG. 6 shows a block diagram of a receiver. In FIG. 6, the numerals 7-2, 7-3, 7-5 and 7-6 are the same as those in FIG. 2, and 7-11 is a timing circuit, and 7-12 is a receive level difference measurement circuit. The numerals 7-13 and 7-14 are sample hold circuits, 7-15 and 7-16 are subtractors, and 7-17 is an error prediction circuit. The feature of the embodiment of FIG. 6 is to measure the receive level twice for each antenna, instead of the use of a differentiating circuit. The difference of two measured receive levels is used instead of the differenting coefficient.

Figure 7A:
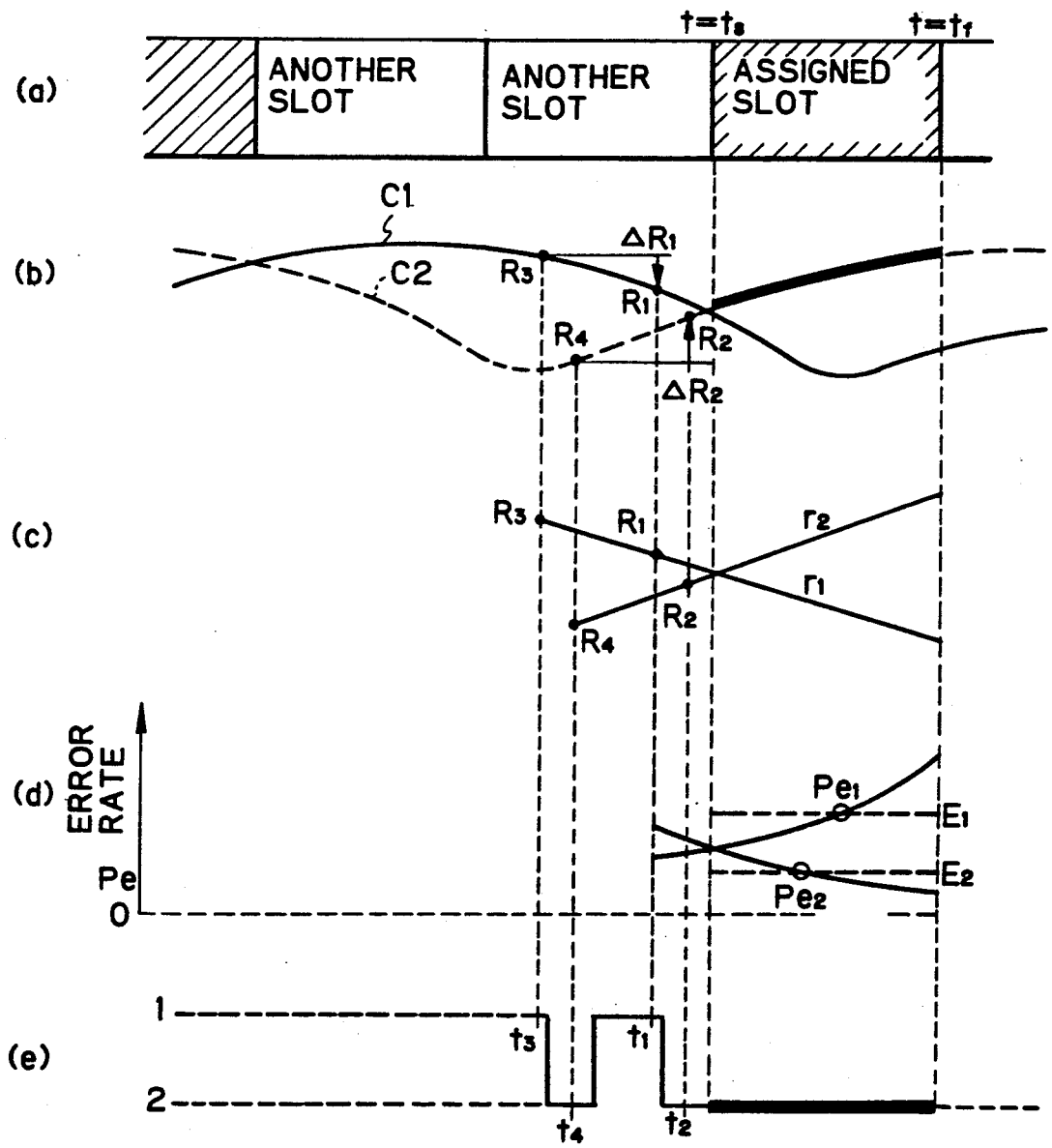
FIG. 7A shows the operation of the antenna selection in the second embodiment of the present invention.

FIG. 7A shows the operation of the antenna selection in the second embodiment. FIG. 7A(a) shows the frame structure, which is the same as that of FIG. 3A(a). The timing circuit 7-11 forwards the receive level difference measurement circuit 7-12 a trigger signal at time $t_3$ which is a little before the beginning of the assigned burst signal so that the receive level $R_3$ at time $t_3$ in the antenna 1 is kept in the sample hold circuit 7-13. Then, the switch control circuit 7-2 switches the selection switch 3 to the other antenna 2 at time $t_4$ which is immediate after the time $t_3$ so that the receive level $R_4$ in the antenna 2 is kept in the sample hold circuit 7-14. Next, the antenna 1 is connected again, and the receive level $R_1$ in the antenna 1 at time $t_1$ is kept in the sample hold circuit 7-5. Finally, the antenna is again switched to the antenna 2, and the receive level $R_2$ in the antenna 2 at time $t_2$ is kept in the sample hold circuit 7-6. Thus, four receive levels $R_1$ through $R_4$ are obtained as shown in FIG. 7A(b) (152 in FIG. 5).

The receive level difference measurement circuit 7-12 calculates the differences $\Delta R_1(=R_1-R_3)$, and $\Delta R_2(=R_2-R_4)$ for each of the antennas by using the subtractors 7-15 and 7-16 (154 in FIG. 5). The error prediction circuit 7-17 predicts the receive levels $r_1$ and $r_2$ for each of the antennas in the assigned time slot by using above values $R_1$, $R_2$, $\Delta R_1$ and $\Delta R_2$ as follows.

$$r_i(t) = R_i + \frac{\Delta R_i}{t_i - t_{i+2}}(t - t_i) \quad (i = 1,2) \tag{4}$$

The values $r_1$ and $r_2$ thus obtained are shown in FIG. 7A(c), and those values are used for providing the error rates $E_1$ and $E_2$ in the equation (2), and the results are shown in FIG. 7A(d) (156 in FIG. 5). As $E_1 > E_2$ is satisfied in FIG. 7A(d) (158 in FIG. 5), the switch control circuit 7-2 selects the antenna 2 as shown in FIG. 7A(e) (162 in FIG. 5). If $E_1 \leq E_2$ is satisfied, the antenna 1 is selected (160 in FIG. 5). Thus, the average error rate at the assigned time slot is kept low.

When the receive operation in the assigned time slot S3 finishes (164 in FIG. 5), the operation returns to the box 152 in FIG. 5 so that the similar operation is repeated for the succeeding frames.

It should be appreciated that the concept of FIG. 7A which uses a subtractor instead of a differentiation circuit may be combined with the concept of FIG. 3B which uses the receive level of each antenna at center of an assigned slot, and/or the concept of FIG. 3C which uses the minimum receive level of each antenna as criteria of the selection of antennas.

When the concept of FIG. 7A is combined with the concept of FIG. 3B, the receive level $M_i$ of each antenna (i=1 or 2) at the center of the assigned slot is calculated as follows.

$$M_i = R_i + \frac{\Delta R_i[(t_s + t_f)/2 - t_i]}{t_i - t_{i+2}} \quad (i = 1,2) \tag{4A}$$

When the concept of FIG. 7A is combined with the concept of FIG. 3C, the minimum receive level $L_i$ in the assigned slot is predicted according to the following equation.

$$\left. \begin{array}{l} L_i = R_i + \dfrac{\Delta R_i(t_s - t_i)}{t_i - t_{i+2}} \quad (\Delta R_i \geq 0) \quad (i = 1,2) \\[6pt] L_i = R_i + \dfrac{\Delta R_i(t_f - t_i)}{t_i - t_{i+2}} \quad (\Delta R_i < 0) \quad (i = 1,2) \end{array} \right\} \tag{4B}$$

Figure 7B:
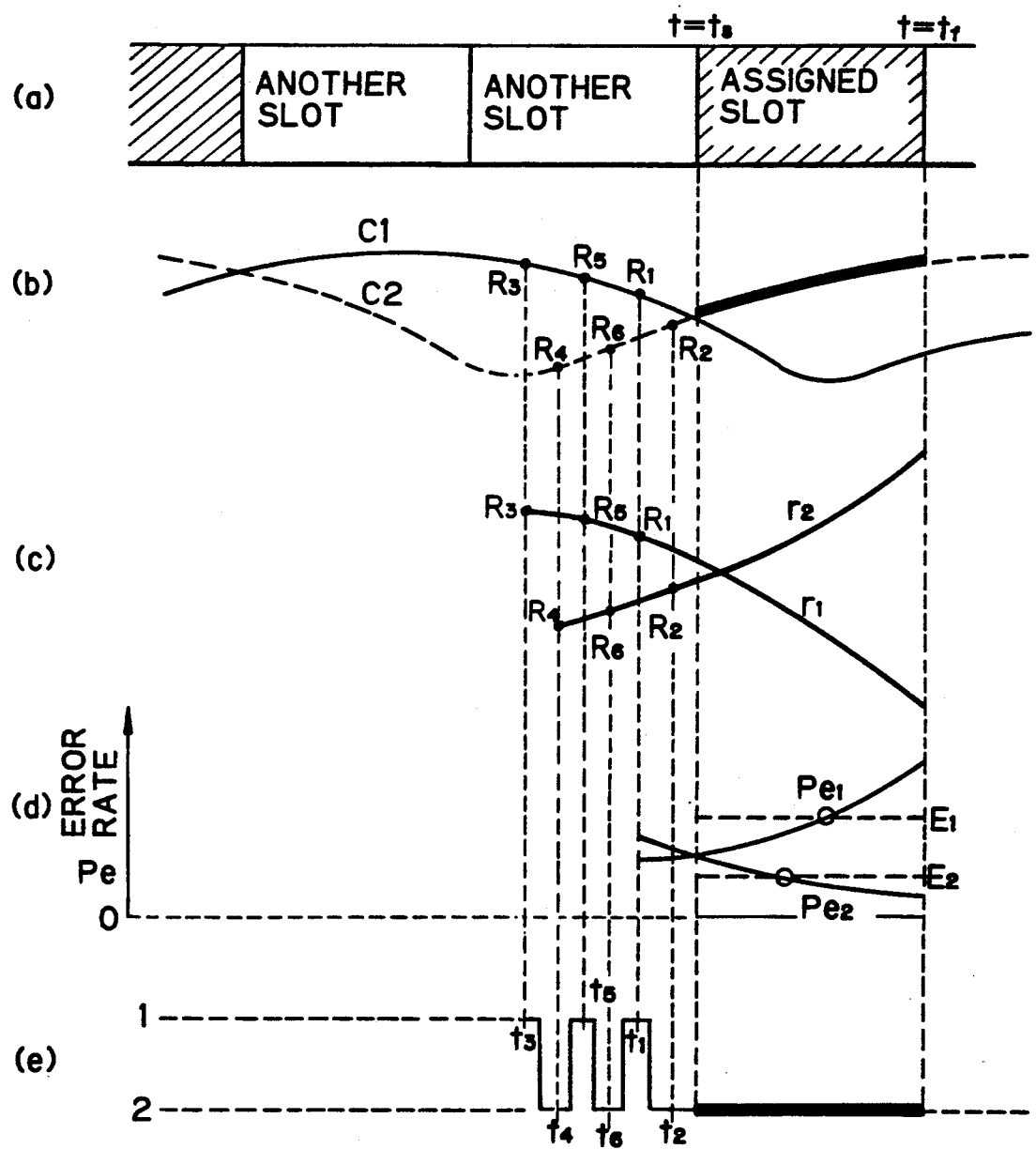
FIG. 7B is the modification of FIG. 7A.

FIG. 7B shows the modification of FIG. 7A, and the feature of the modification of FIG. 7B is to measure the receive level more than three times for each antenna, and the prediction of the receive level in an assigned slot is carried out non-linearly, while the embodiment of FIG. 7A predicts the receive level in the assigned time slot linearly.

In the modification of FIG. 7B, the measurement of receive level is carried out three times for each antenna, and the receive levels $R_3$, $R_5$ and $R_1$ are obtained for the antenna 1, and the receive levels $R_4$, $R_6$ and $R_2$ are obtained for the antenna 2. The receive level $r_1$ for the antenna 1 in an assigned slot, and the receive level $r_2$ for the antenna 2 in an assigned slot are predicted by using those measured receive levels. In case of three measured values, the predicted curve is quadratic. The average error rate is then calculated by using the equation (2), and the antenna selection is carried out so that the antenna which provides the lower average error rate is selected.

It should be appreciated of course that the concept of FIG. 7B may be combined with the concepts of FIG. 3B and/or FIG. 3C. In other words, the criteria of the selection of the antennas may be the receive level at the center of the assigned time slot of each antenna predicted by using more than three measured receive levels, and/or the minimum recieve level in the assigned burst slot predicted by using more than three measured receive levels.

Figure 8:
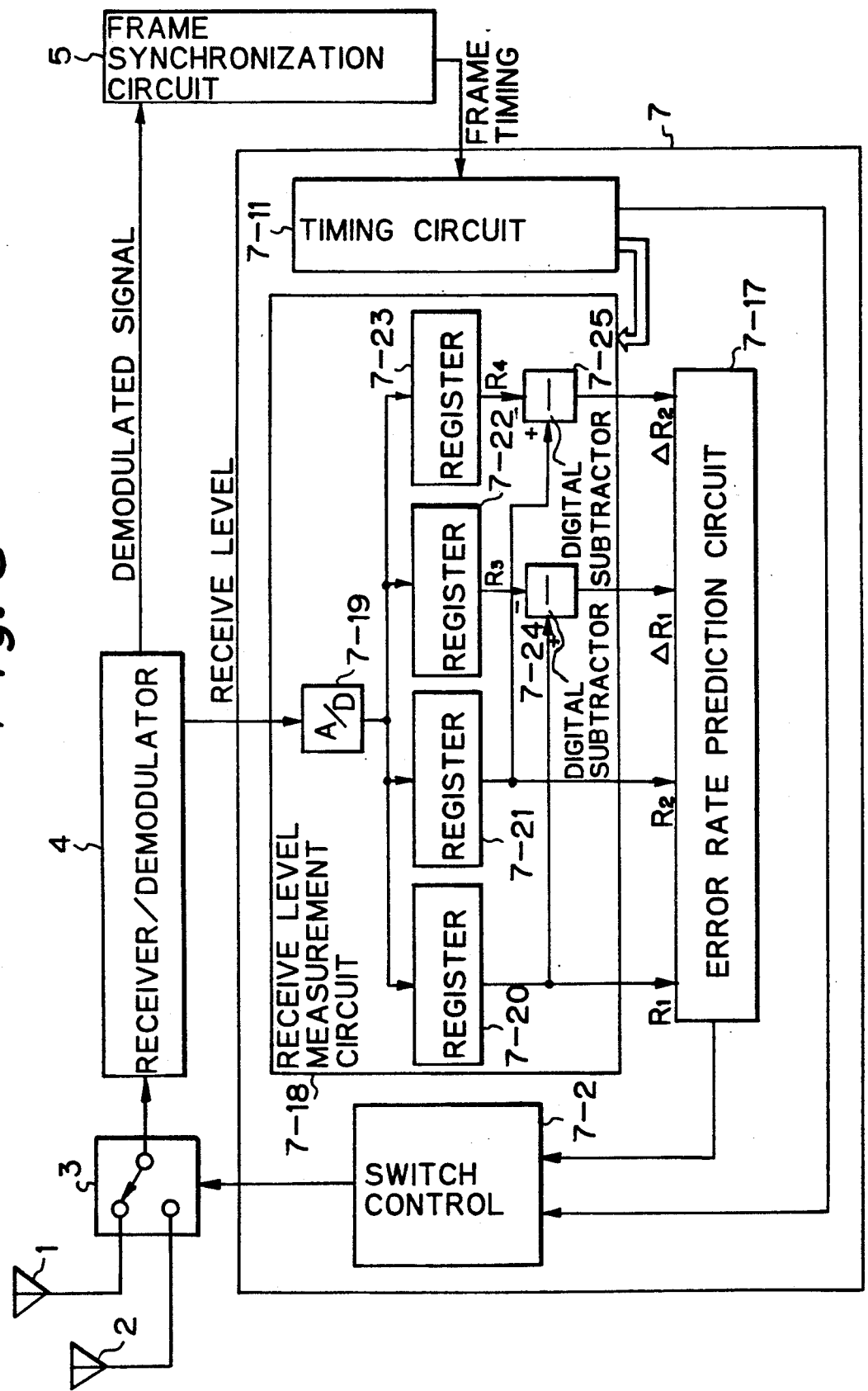
FIG. 8 is a block diagram of an antenna selection diversity receiver of the third embodiment of the present invention.

FIG. 8 is a block diagram of the third embodiment of the present invention. The feature of FIG. 8 is that the main portion of the embodiment of FIG. 6 is implemented by digital circuits. In FIG. 6 embodiment, the receive levels $R_1$ through $R_4$ are kept in four sample hold circuits, on the other hand, in FIG. 8 embodiment, a single A/D converter 7-19 measures the receive levels at times $t_1$ through $t_4$ four times, and the measured values are stored in four registers 7-20 through 7-23.

The registers 7-20 and 7-21 provide the receive levels $R_1$ and $R_2$, respectively, and the digital subtractors 7-24 and 7-25 calculate the receive level differences $\Delta R_1$ and $\Delta R_2$. Therefore, the receive level measurement circuit 7-18 in FIG. 8 is equivalent to the receive level measurement circuit 7-3 and receive level difference measurement circuit 7-12 in FIG. 6. The circuit 7-18 in FIG. 8 provide the values $R_1$, $R_2$, $\Delta R_1$, and $\Delta R_2$ in digital form. The average error rates $E_1$ and $E_2$ are predicted as is the case of FIG. 6, and the antenna which provides the lower error rate is selected. The error rate prediction circuit 7-17 receives $R_1$, $R_2$, $\Delta R_1$ and $\Delta R_2$ in quantized digital form each having n bits. For example, the error rate prediction circuit 7-17 can be implemented by a ROM (read only memory), which has address input terminals with 4n bits, and each address of the ROM stores the result of the comparison of $E_1$ and $E_2$. The embodiment of FIG. 8 implements the process of $R_1$ through $R_4$, $E_1$ and $E_4$ in digital form, and therefore, the circuit is implemented easily by using an IC.

The digital subtractors 7-24 and 7-25 may be removed if the error rate prediction circuit 7-17 carries out the function of those subtractors. In that case, the error rate prediction circuit 7-17 receives $R_1$ through $R_4$ in quantized digital form. For instance, when $R_1$ through $R_4$ are applied to 4n bits of address terminals of a ROM, which stores the result of the comparison of $E_1$ and $E_2$ corresponding to each input values, the error rate prediction circuit 7-17, and the subtractors 7-24 and 7-25 are implemented by a single ROM.

It should be appreciated that the present invention is applicable to a diversity receiver which has more than three antennas, although the above embodiments have two antennas. When there are more than three antennas in the embodiment of FIG. 2, the calculation of the equations (1) and (2) is carried out for each antenna, and the antenna which provides the lowest error rate is selected. In case of the embodiment of FIG. 6 or FIG. 8, the receive level for each antenna is measured twice, and the calculation of the equation (4) is carried out for each antenna, and the result is inserted into the equation (2) so that the antenna which provides the lowest average error rate is selected.

It should be appreciated of course that the concept of a digital circuit is applicable to not only to the embodiment of FIG. 6, but also to any one of the above embodiments and modifications.

Figure 9:
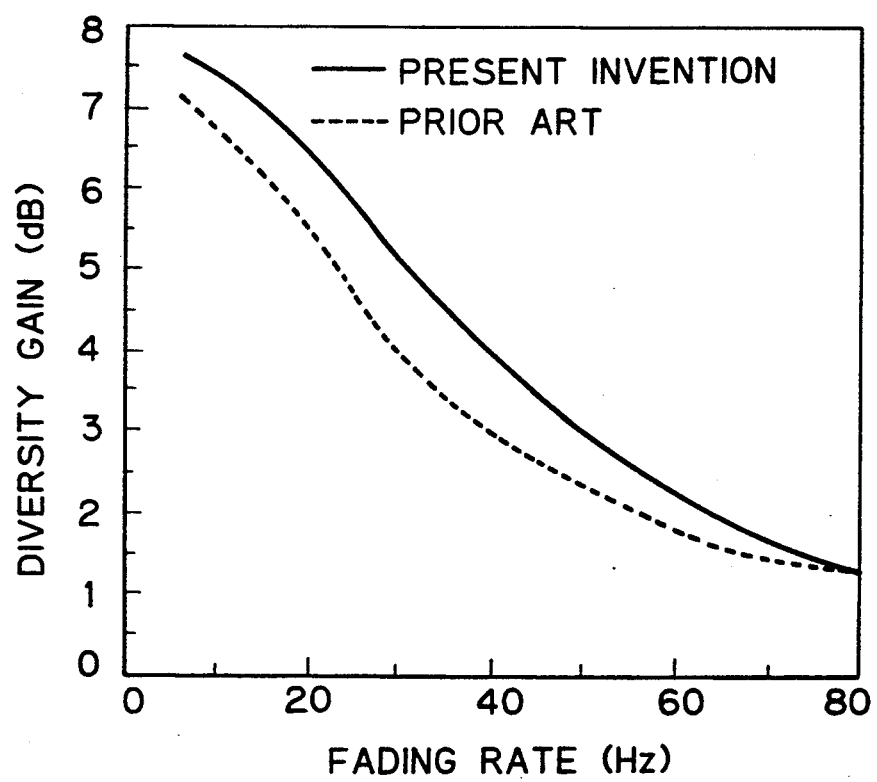
FIG. 9 shows the curves showing the effect of the present invention.

FIG. 9 shows the simulated performance curve which shows the effect of the present invention. In the figure, the horizontal axis shows the fading frequency in Hz, and the vertical axis shows the diversity gain in dB, which is defined to be the input level difference between a diversity receiver and an ordinary (not diversity) receiver for providing an error rate of 1%. The solid line in FIG. 9 shows the curve of the present invention, and the dotted curve shows that of the prior art of FIG. 10. As apparent in FIG. 9, the diversity gain of the present invention is always higher than that of the prior art in any fading frequency.

As mentioned above, according to the present invention, an antenna diversity receiver which provides an excellent diversity effect in high fading rate is obtained. Therefore, when a receiver is mounted on a moving mobile, an excellent diversity effect is obtained, and therefore, the present invention may be used in many mobile communication systems. The reception capability of a receiver is improved considerably by using the present invention.

The present invention may replace a conventional diversity receiver which has two receivers selected at the output of detectors, and in that case, a receiver may be improved in size, and power consumption, since the present invention uses only one receiver.

From the foregoing, it will now be apparent that a new and improved antenna diversity system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An antenna selection diversity receiver system for a TDM receive signal comprising:
    a plurality of antennas,
    a selection switch for selecting one of said antennas,
    a receiver/demodulator coupled with the selected antenna through said selection switch for providing a demodulated receive signal and a receive level,
    a frame synchronization circuit coupled with output of said receiver/demodulator for effecting frame synchronization of said TDM signal,
    an antenna selection circuit coupled with output of said receiver/demodulator for receiving said receive level, and coupled with said selection switch for controlling said selection switch,
    said antenna selection circuit comprising;
    a timing circuit coupled with said frame synchronization circuit for finding a beginning of an assigned time slot,
    first storage means for storing said receive level of each antenna just before said assigned time slot,
    slope means for providing a slope of said receive level of each antenna,
    second storage means for storing output of said slope means,
    prediction means for predicting receive signal quality of each antenna in said assigned time slot according to said receive level and said slope by using output of said first storage means and said second storage means, and
    a switch control circuit coupled with said timing circuit and said prediction means for switching said selection switch just before a beginning of said assigned time slot for every assigned slot so that an antenna providing the best predicted receive signal quality in said assigned time slot is selected.

2. An antenna selection diversity receiver system according to claim 1, wherein said slope means is a differentiation circuit.

3. An antenna selection diversity receiver system according to claim 1, wherein said slope means comprises a subtractor for providing a difference of two receive levels at different times for each antenna.

4. An antenna selection diversity receiver system according to claim 1, wherein said first storage means and said second storage means are implemented by a digital register, and said slope means and said predictor means are implemented by a ROM.

5. An antenna selection diversity receiver system according to claim 1, wherein said prediction means predicts an average error rate of each antenna in said assigned time slot as said receive signal quality.

6. An antenna selection diversity receiver system according to claim 1, wherein said prediction means predicts said receive level of each antenna at the center of the assigned time slot as said receive signal quality.

7. An antenna selection diversity receiver system according to claim 1, wherein said prediction means predicts the minimum receive level of each antenna in the assigned time slot as said receive signal quality.

8. An antenna selection diversity receiver system according to claim 1, wherein more than three receive levels for each antenna are measured for prediction of receive signal quality in said assigned time slot.

* * * * *